R. WILD.
MANICURE IMPLEMENT.
APPLICATION FILED OCT. 26, 1917.
1,285,863.
Patented Nov. 26, 1918.
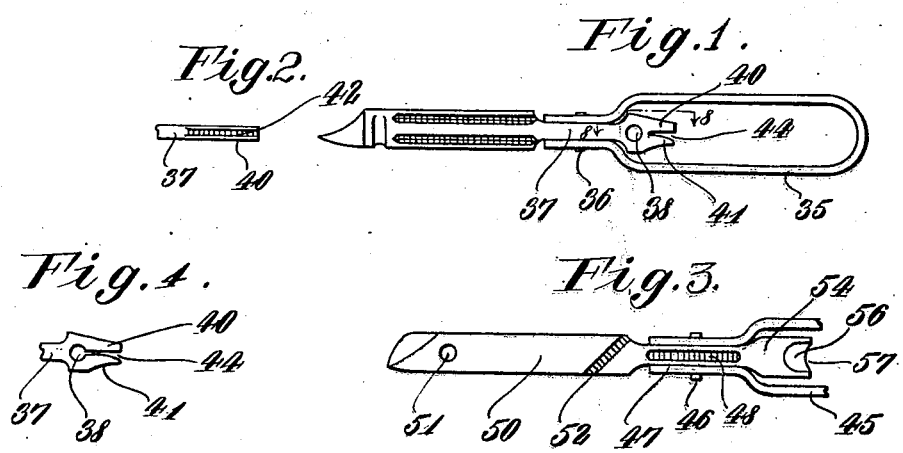
INVENTOR.
Rudolf Wild.
Oscar Gill
BY
HIS ATTORNEY

UNITED STATES PATENT OFFICE.

RUDOLF WILD, OF LOS ANGELES, CALIFORNIA.

MANICURE IMPLEMENT.

1,285,863.     Specification of Letters Patent.     Patented Nov. 26, 1918.

Application filed October 26, 1917. Serial No. 198,555.

*To all whom it may concern:*

Be it known that I, RUDOLF WILD, a subject of the Emperor of Germany, resident of Los Angeles, county of Los Angeles, and State of California, have invented certain new and useful Improvements in Manicure Implements, of which the following is a specification.

This invention relates to improvements in manicure implements, and has as its special object the provision of a novel form of nail trimmer, the same being combined with a concave rasp or file, together with a device for removing the accumulation which collects below the nail.

These and other like objects are attained by the novel construction and combination of parts hereafter described and shown in the accompanying drawings, forming a material part of this disclosure, and in which—

Figure 1 is a side elevational view showing the preferred form of implement.

Fig. 2 is a sectional view taken on line 8—8 of Fig. 1.

Fig. 3 is a fragmental side elevational view showing a modification in construction, and Fig. 4 is a fragmental detailed view showing a combined cleaner and cutter element.

As shown, a spring handle 35 is engaged by the pins 36, with a shank 37, containing an opening 38, beyond which extend two prongs respectively 40 and 41, the rear edge of the prong 40 being formed with a concave groove 42, having corrugations as indicated, while the prong 41 is so shaped as to enter between the nail and flesh in an obvious manner, the nail extending into the recess 44, for that purpose.

Fig. 3 shows a similar spring handle 45, engaged by the pins 46, with a shank 47, containing an arcuate longitudinal groove 48, shaped and provided with teeth as previously described, the extending end of the cutter 50 having an aperture 51, which may be used and sharpened as previously indicated.

Also formed in the blade 50, are one or more angularly disposed concave recesses 52, furnished with teeth as before described.

The opposite end of the shank 47 is formed with extending head 54, containing a concave recess 56, terminating in a sharp chisel like cutter 57, by means of which the nails may be trimmed prior to making use of the file-like depression indicated, and it will be obvious that the implement may be folded with the blade portion within the handle element, so as to present no impediment.

Having thus described my invention what I claim as new and desire to secure by Letters Patent, is—

1. In a manicure implement, the combination with an operative handle, a bar engaged therewith, said bar containing one or more relatively narrow recesses of semi-circular cross-section, and teeth formed in the sides and bottoms of said recesses, of a head formed with said bar, said head containing a through opening formed with sharp edges, prongs extending beyond the mentioned opening, one of said prongs having a concave groove along its edge, containing teeth, and the other of said prongs being adapted for use as a cleaning instrument.

2. In a manicure implement, the combination with a spring handle forming an open loop, a neck formed with said handle, a perforated shank engaged in said neck, pins connecting said shank and neck, two prongs on said shank forming a recess for the introduction of a nail between both prongs, and extending beyond the perforation in said shank, the rear edge of one of said prongs formed with a concave groove, corrugations in said groove, the other of said prongs adapted to enter between the flesh and a nail, and a cleaning point at the outer end of said shank, substantially as described and for the purpose set forth.

In testimony whereof I have affixed my signature.

RUDOLF WILD.

Copies of this patent may be obtained for five cents each, by addressing the "Commissioner of Patents, Washington, D. C."